US012749638B2

(12) United States Patent
Bernard et al.

(10) Patent No.: US 12,749,638 B2
(45) Date of Patent: Sep. 29, 2026

(54) SF6 FREE GAS INSULATED DISCONNECTOR WITH LIMITED ARCING VOLUME

(71) Applicant: General Electric Technology GmbH, Baden (CH)

(72) Inventors: Félix Bernard, Aix-les-Bains (FR); Olivier Guyon, Aix-les-Bains (FR); Matthias Montbel, Aix-les-Bains (FR)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 345 days.

(21) Appl. No.: 18/428,090

(22) Filed: Jan. 31, 2024

(65) Prior Publication Data

US 2024/0258049 A1 Aug. 1, 2024

(30) Foreign Application Priority Data

Jan. 31, 2023 (EP) .................................... 23305118

(51) Int. Cl.
*H01H 33/02* (2006.01)
*H01H 33/664* (2006.01)
*H02B 13/035* (2006.01)

(52) U.S. Cl.
CPC ......... *H01H 33/664* (2013.01); *H02B 13/035* (2013.01); *H01H 33/021* (2013.01)

(58) Field of Classification Search
CPC .... H01H 33/664; H01H 33/021; H01H 33/22; H01H 33/12; H01H 33/122; H01H 33/02; H01H 33/04; H01H 33/666; H01H 1/385; H01H 1/38; H01H 2033/566; H01H 31/32; H02B 13/035; H02B 7/01
USPC ........ 218/16, 12, 13, 18, 45, 55, 59, 79, 80, 218/100
See application file for complete search history.

(56) References Cited

U.S. PATENT DOCUMENTS 8,106,326 B2 * 1/2012 Nakauchi ............. H01H 31/003 218/55
8,232,496 B2 * 7/2012 Granhaug ............. H01H 1/385 218/46
9,117,608 B2 * 8/2015 Nakada .................. H01H 33/12
10,256,058 B2 4/2019 Fujoka et al.
10,395,855 B2 * 8/2019 Kubota .................. H01H 1/385
11,127,550 B2 * 9/2021 Mclaughlin ............ H01H 33/40
2007/0246444 A1 * 10/2007 Saxl ....................... H01H 1/385 218/16

(Continued)

FOREIGN PATENT DOCUMENTS

JP S5524718 U 2/1980

OTHER PUBLICATIONS

Extended European Search Report issued in EP Application No. 23305118.4 dated Jul. 28, 2023, 10 pages.

*Primary Examiner* — William A Bolton
(74) *Attorney, Agent, or Firm* — Eversheds Sutherland (US) LLP

(57) ABSTRACT

A disconnector for a GIS, including a pair of permanent contacts, one fixed and the other one movable along an axis, called the axis of the disconnector, a pair of arcing contacts, one fixed and the other one movable, an insulating part located inside the fixed arcing contact, means for pressing the insulating part against a front surface of the movable arcing contact, and an insulating ring located at the outlet of the fixed arcing contact.

14 Claims, 6 Drawing Sheets

(56) References Cited

U.S. PATENT DOCUMENTS

| | | | | |
|---|---|---|---|---|
| 2014/0360984 | A1* | 12/2014 | Moriyama | H01H 33/12 218/146 |
| 2016/0241004 | A1* | 8/2016 | Kieffel | H01B 3/56 |

* cited by examiner

SF6 FREE GAS INSULATED DISCONNECTOR WITH LIMITED ARCING VOLUME

TECHNICAL FIELD AND PRIOR ART

The invention relates to the gas-insulated substations, commonly referred to as Gas-Insulated Substations (GISs). Substations of this type comprise switchgears, in particular busbar disconnectors. Pieces of switchgear are generally insulated using sulfur hexafluoride ($SF_6$) in metal tanks filled with $SF_6$ under pressure, for example at a service pressure of 0.4 megapascals (MPa) to 0.8 MPa, e.g. 0.7 MPa.

Sulfur hexafluoride ($SF_6$) being estimated to contribute to the greenhouse effect, it was recently replaced by another gas, the so-called "g3" gas, comprising heptafluoroisobutyronitrile mixed with a dilution gas comprising carbon dioxide and oxygen is used in replacement of $SF_6$, opening the path to a new generation of high voltage (HV) electrical transmission equipment. This g3 gas has a drastically reduced environmental impact (more than 99% less gas global warming potential (GWP)).

But it has been noticed that powder is generated during the opening of circuit-breakers of GIS implementing said gas. This powder, which results from the decomposition of the g3 gas used in replacement of the $SF_6$ is harmful for dielectric strength.

There is therefore the problem of limiting the generation of this powder and/or of confining it, partially or fully.

There is another problem, which is the duration of the arc: there is no possibility today to limit said duration, whatever the gas; in the case of the g3 gas, said duration contributes to more decomposition of the gas as explained above.

There is thus the problem of finding a new disconnector, able to reduce the duration of the arc when opening a disconnector.

There is thus the problem of finding a new disconnector, able to reduce the duration of the arc when opening a disconnector.

Accelerating the speed of the opening phase of the disconnector is not favourable, because it reduces the number of zero current crossings, at which the arc extinguishes. Furthermore, increasing the opening speed induces wear phenomena that degrade performance of the device.

There is also a problem of misalignment of the contacts with respect to the axis of the disconnector. More precisely, the movable arcing contact aligns according to the movable main contact or follows the alignment of movable main contact, which may itself be misaligned. This reduces the opening speed but also results in an arc not being homogeneous around the central axis of the device (both the axis of the fixed arcing contact and the movable arcing contact may be slightly offset from each other) and in an irregular wear at the periphery of both arcing contacts.

There is another problem. Generally speaking disconnectors don't have switching capabilities (compared to Circuit Breakers). However, IEC standard requires two switching capabilities for disconnectors, in particular GIS disconnectors which are set up in a double busbar arrangement with coupling:

Bus Transfer Current Switching (BTCS);

Bus Charging Current Switching (BCCS).

Due to this IEC requirement BTCS, one needs to find a solution to be able to switch these currents. The problem with the new gas "g3" was the generation of powder during this BTCS. A solution must be found to solve this problem.

SUMMARY OF THE INVENTION

In order to solve one or more of the above problems, the inventors have found a solution to confine the arc generated during disconnector switching.

The invention first concerns a disconnector for a GIS comprising:

- a pair of permanent contacts, one fixed and the other one mobile along an axis (AA'), called the axis of the disconnector;
- a pair of arcing contacts, one being fixed and the other one mobile.

In an embodiment, it further comprises:

- an insulating part located inside said fixed arcing contacts, and means for pressing said insulating part against a front surface of the movable arcing contact;
- an insulating ring located at the outlet of the fixed arcing contact.

When the arcing contacts separate, they form, together with the insulating part and the insulating ring, a limited volume which contains a limited quantity of gas. Thus, only a limited quantity of gas can be decomposed by the arc. This is particularly favourable when using a gas which otherwise generate much powder, as already explained above.

Said insulating ring:

- can have a V-shaped section in a plane containing said axis;
- and/or can extend along the axis between a front face which faces said fixed arcing contact and an opposite back face and its internal surface having a restriction between said both ends.

An internal surface of said insulating ring can have a first slope which is inclined in a first direction from said front face to the restriction and then a second slope which is inclined in the opposite direction from the restriction to the back face. Said second slope can be inclined with an angle comprised between 50° and 10° with respect to the axis of the circuit breaker.

In a disconnector according to the invention, as defined above or in the rest of this application, a front end of the fixed arcing contact can have a concave portion, for example a stair step shape; this allows a shorter duration of the arc and therefore limits the decomposition of the gas of the GIS.

In a disconnector according to the invention, at least part of the insulating part located inside said fixed arcing contact can have the shape of a disk or of a cylinder.

The insulating part located inside said fixed arcing contact can comprise a stopping member cooperating with a stopping member of the fixed arcing contact to block the movement of the insulating part under the action of the means for pressing said insulating part against a front surface of the movable arcing contact.

The invention also concerns a GIS comprising:

- a metal tank filled with a gas;
- a disconnector according to the invention, as disclosed above or in this application.

The gas can be for example $SF_6$, but alternatively it can comprise an alternative gas, for example comprising heptafluoroisobutyronitrile and/or heptafluoroisopropyl trifluoromethyl ketone (also named 2-butanone, 1,1,1,3,4,4,4-heptafluoro-3-(trifluoromethyl)-(CAS No 756-12-7)) and/or $CO_2$ and/or $O_2$ and/or $N_2$ and/or an oxygenated compounds; for example it can comprise both $CO_2$ and a fluorinated compound, for example heptafluoroisobutyronitrile and/or heptafluoroisopropyl trifluoromethyl ketone. Said alternative gas can decompose and generate much powder as explained above.

The invention also concerns a method for opening a disconnector of a GIS according to the invention, as disclosed above or in this application; in an embodiment, it comprises:

- moving the movable arcing contact and the movable main contact with respect to the fixed arcing contact and the fixed main contact, thereby opening the main contacts and closing the pair of arcing contacts, and pressing the insulating part located inside said fixed arcing contacts against a front surface of the movable arcing contact;
- separating said pair of arcing contacts from each other, thereby triggering an arc between them, in a volume limited by said arcing contacts and by both said insulating part and said insulating ring.

DETAILED DESCRIPTION OF SPECIFIC EMBODIMENTS

Figure 1:
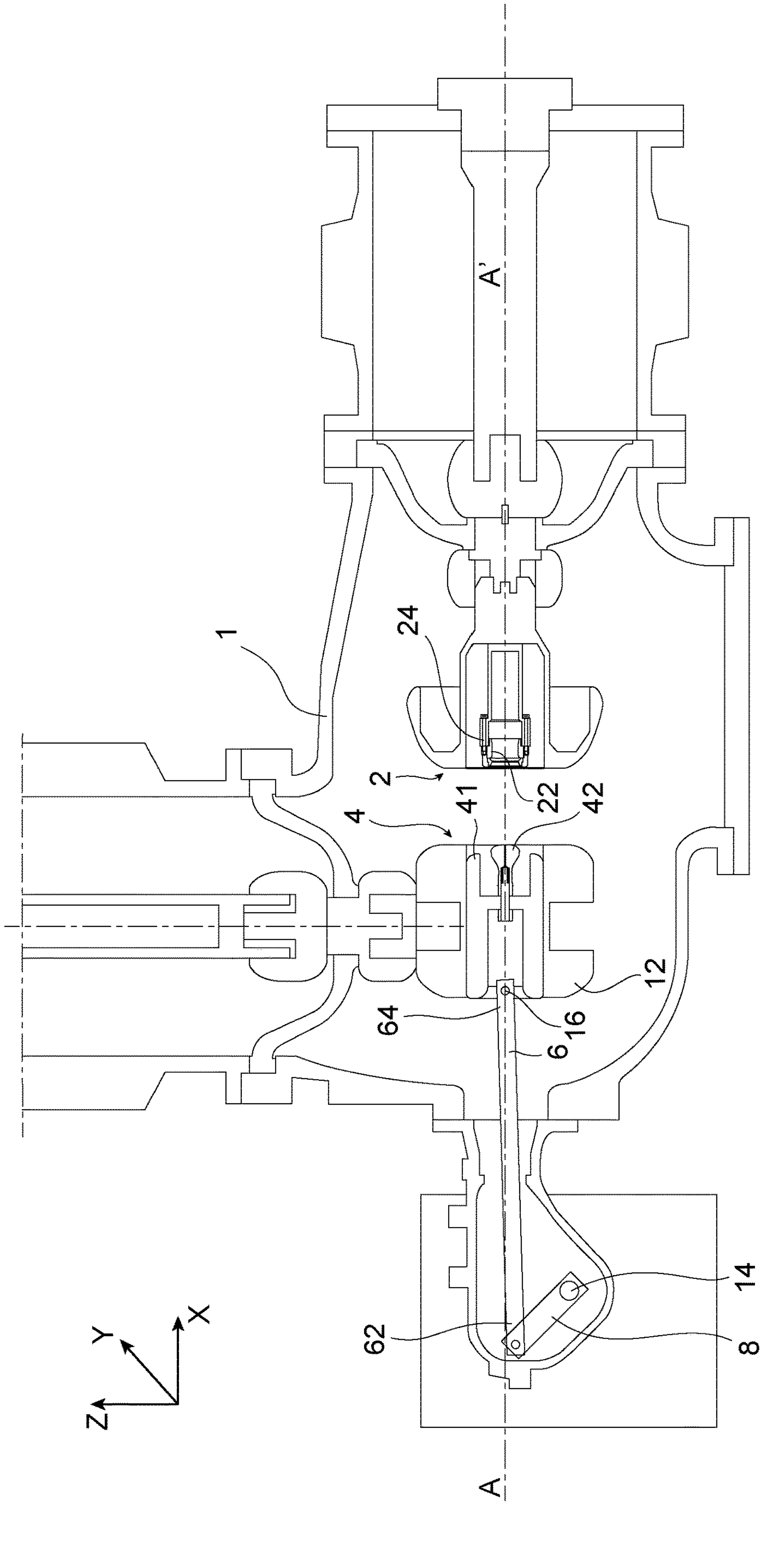
FIG. 1 shows an example of a Gas-Insulated Substations.

An example of a metal tank 1, or interrupting chamber, comprising a disconnector according to the invention, is illustrated on FIG. 1. The metal tank 1 is filled with a gas, for example $SF_6$ or another gas, for example comprising heptafluoroisobutyronitrile and/or heptafluoroisopropyl trifluoromethyl ketone (also named 2-butanone, 1,1,1,3,4,4,4-heptafluoro-3-(trifluoromethyl)-(CAS No 756-12-7)) and/or $CO_2$ and/or $O_2$ and/or $N_2$ and/or an oxygenated compounds; for example said other gas can comprise both $CO_2$ and a fluorinated compound, for example heptafluoroisobutyronitrile and/or heptafluoroisopropyl trifluoromethyl ketone.

The device of FIG. 1 comprises a disconnector which extends along an axis AA' and which comprises a pair of contacts 2, 4 mounted to move relative to each other along said axis AA' with help of an actuation system 6, 8. They can move from a closed position in which the electric current can flow to an open position in which the electric current is interrupted and vice-versa.

By convention, the term "main contact" is used to designate an electrical contact via which the rated current passes; the main contact is associated with an "arcing contact" which performs the function of breaking proper. The term "moving contact" is used to designate the main and arcing contact assembly that is connected directly to the actuation system 6, 8.

The disconnector comprises:

- a first moving contact 4 made up of an arcing contact 42, e.g. in the form of a plurality of fingers, and of a main contact 41;
- and a second contact 2 that is stationary in this example, made up of an arcing contact 22 and of a main contact 24 (the rings 240 and 241 in the example described below).

More details about the disconnector are given below; but these two contacts co-operate between an open position in which the two contacts 2, 4 are separated from each other (see FIG. 1) and a closed position (not shown) in which they allow electrical current to pass between them.

During the breaking procedure, the two main contacts 41, 24 separate first, and then the arcing contacts 42, 21 separate, after a latency period, if any, generated by the length of the mutual engagement, forming an electric arc that is extinguished by the contact 4 subsequently being moved further away.

An example of a disconnector according to the invention and which can be implemented in the device of FIG. 1 is more precisely illustrated on FIGS. 2A-2E. It extends along the longitudinal axis AA'.

The movable contact 4 comprises the main contact 41, in the form of a tube 30, and the movable arcing contact 42.

The movable contact 4 can be moved between a closed position (FIG. 2A) and an open position (FIG. 2D), with help of an actuation system 6, 8.

The movable arcing contact 42 is formed by the contact area itself 42 (it is made for example of a conductive and heat resistant material CuW) at the end of flexible fingers (made for example of a conductive or highly conductive material like CuCr). In other words, part 42 is preferably bi-material, the 2 materials can be welded for example by Electron Beam Welding. At one end, it can be made of CuW to sustain arc heat and to be conductive. At the other end, it can be conductive and flexible (forming "fingers"). This part 42 can be fixed using basic screw(s), to supporting plate 46 or, if supporting plate 46 is integrated to tube 30, it can be directly fixed to the disconnector tube 30.

Figure 3A:
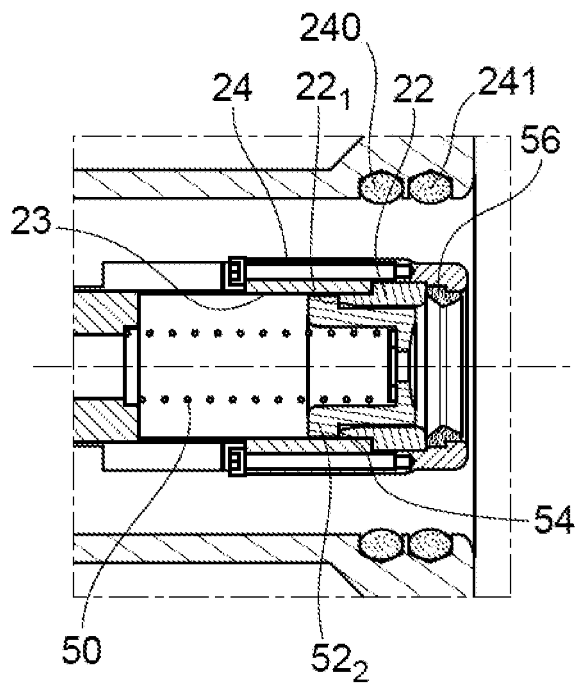
FIGS. 3A-3B show an embodiment of arcing contacts according to the invention.
Figure 3B:
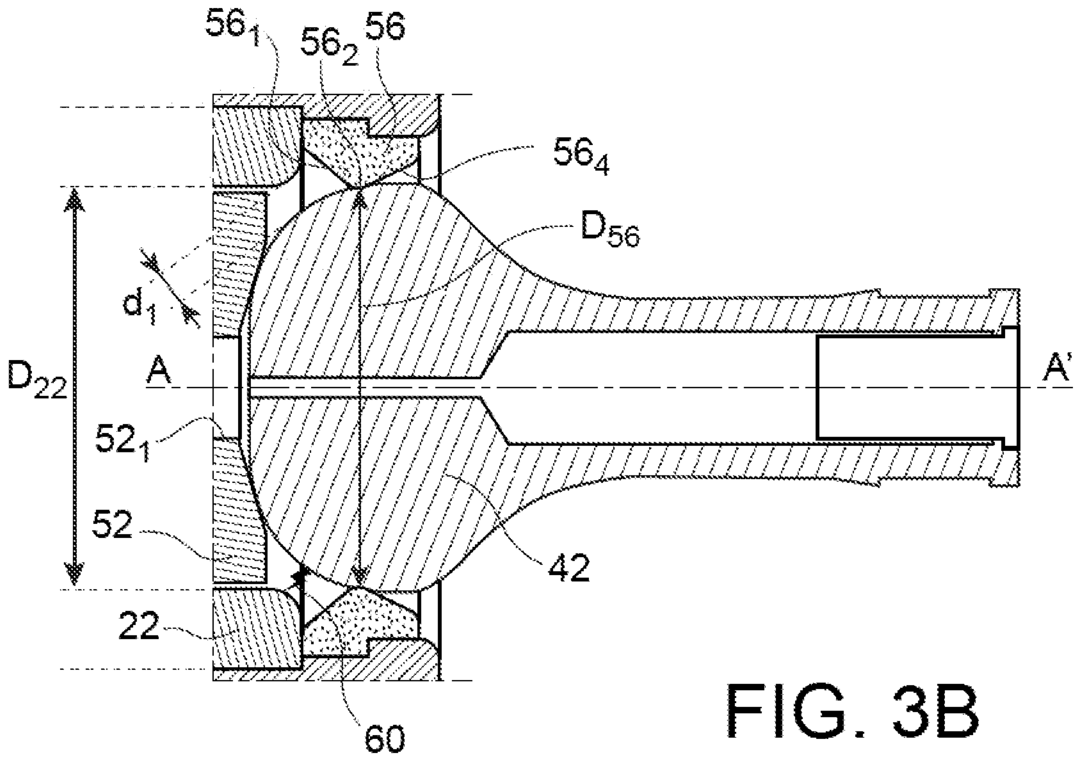

The arcing contact 42 has for example the form of a bulb having an external diameter D42 (see FIG. 2D) which is slightly larger than the internal diameter D22 of the fixed arcing contact 22 (see FIG. 3B). The movable arcing contact 42 comprises for example at least two fingers $\mathbf{42}_1$, $\mathbf{42}_2$ which have some elasticity so that they can be pressed in the direction of the axis AA' by the fixed arcing contact 22; they are separated by a central slot 43 which gives the fingers some freedom to be pressed in the direction of the axis AA', in particular when the movable arcing contact 42 enters the fixed arcing contact 22.

The movable arcing contact is fixedly mounted in the tube 30. For example the end of the cylinder 44 opposed to the arcing contact is fixed in a holding element or supporting plate 46 which is itself maintained in the tube 30 or, if supporting plate 46 is integrated to tube 30, it can be directly fixed to the tube 30.

In the fixed contacts, a piece (or moving tap) 52 of insulating material for example PTFE, is pressed against the movable arcing contact by a spring 50.

This piece 52, or at least part of it, is in the form of, or comprises, a disk or a cylinder, adapted to fit into the fixed acing contact so that at least part of its lateral side(s) is in contact with the inner diameter of the fixed arcing contact 22. It is preferably provided with a central hole $\mathbf{52}_1$, which allows gas to circulate through the piece 52. Its front face $\mathbf{52}_3$, which is intended to bear against the front part of the movable arcing contact 42 can have at least a flat portion or comprise a concave portion adapted, or identical, to the shape of at least part of the front end 423 of the movable arcing contact, in order to better confine the arc which will be established between the contacts 22 and 42.

FIG. 3A shows the fixed arcing contact 22 of the disconnector according to the invention in a completely open position (the movable contacts are not represented for clarity's sake). The main contact(s) is or are formed in this example by two spring rings 240 and 241. Both references 23 and 24 are support elements for arcing contact 22.

The piece 52 is pressed by spring 50 along the AA' axis and in the direction of the arcing contact 42. Preferably the movement of piece 52 is stopped after it has travelled a predetermined distance: it has for example a lateral leg $52_2$ (see FIG. 3A) which abuts against a stop, which can be formed for example by a part, for example a stud or a rear portion $22_1$, of the arcing contact 22.

Figure 2A:
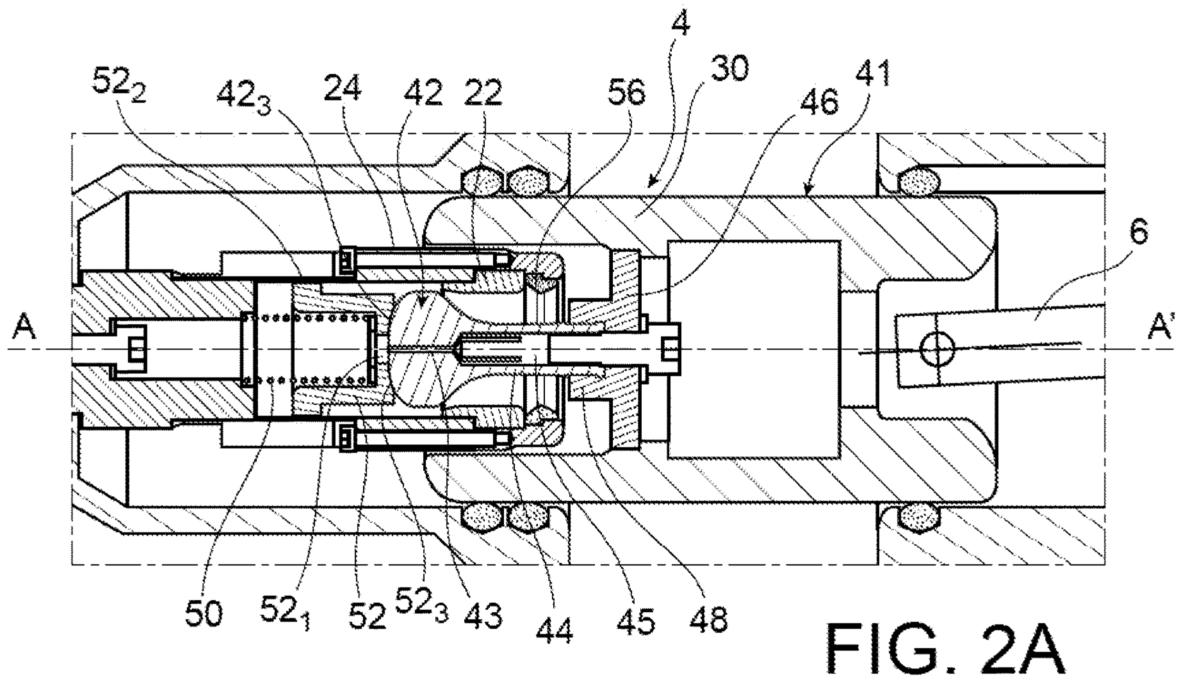
FIGS. 2A-2D show an example of a disconnector according to the invention.

As can be seen on FIGS. 2A and 3A, another piece 56, for example a ring, of insulating material, is located at, or close to, the outlet of the arcing contact 22; this ring is centered on the axis AA'. Preferably, the internal diameter D56 (see FIG. 3B) of at least part of the insulating piece 56 is identical to, or slightly smaller than, the internal diameter D22 of the fixed arcing contact. It can be maintained slightly floating for example in a groove formed by the part 24 and/or fixed arcing contact 22.

Both pieces 52 and 56 can be made for example of PTFE $MOS_2$ compound (or any other material which remains stable at a temperature of about 250° C.

When the movable arcing contact 42 separates from the fixed arcing contact 22, the spring 50 presses piece 52 against the movable arcing contact. An arc occurs when the arcing contacts 22, 42 separate, but the piece 52 is still applied against the front end of the movable arcing contact 42 and, together with the other insulating piece 56, it forms a limited volume inside which the arc occurs.

FIG. 3B shows a detail of the fixed and movable arcing contacts 22, 42 just after their separation. An arc 60 results from their separation, but in a volume limited by the two arcing contacts 22, 42 and also by the insulating pieces 56, 52. Since the insulating piece 52 is pressed by the spring 50 against the movable arcing contact 42, the volume of gas which is exposed to the arc is very limited. This limits the amount of gas which is decomposed by the arc.

FIGS. 2A-2D show different steps of the opening phase of a disconnector according to the invention.

A first position is illustrated on FIG. 2A, in which both main contacts 240/241 and 41 are in contact with each other and was commented above.

Figure 2B:
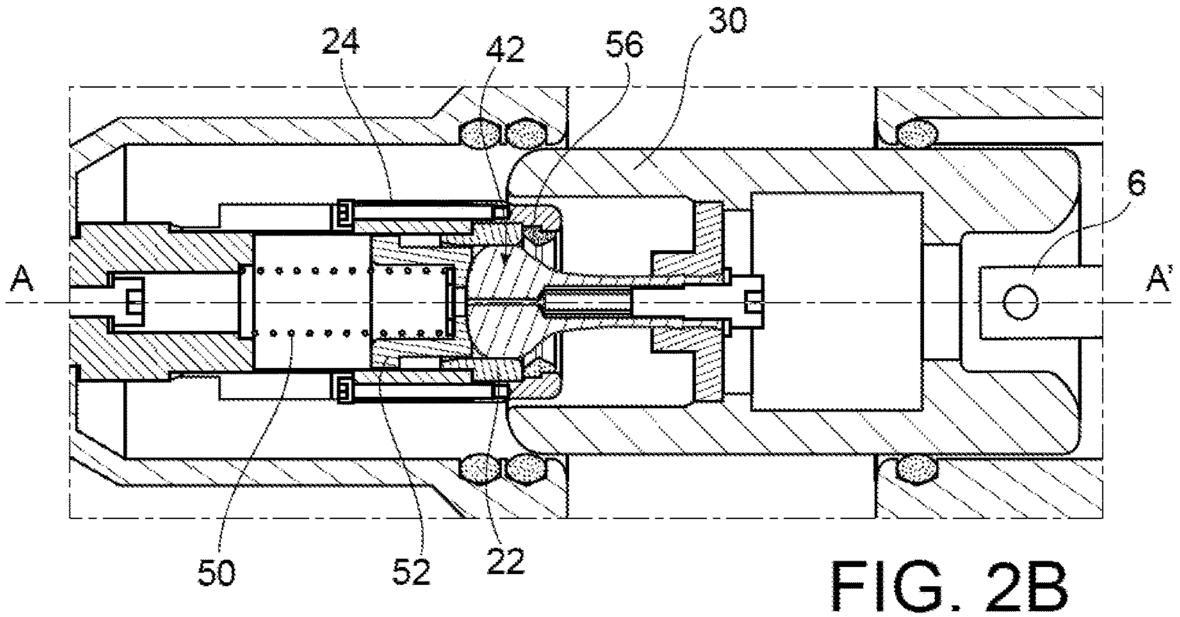
Figure 2C:
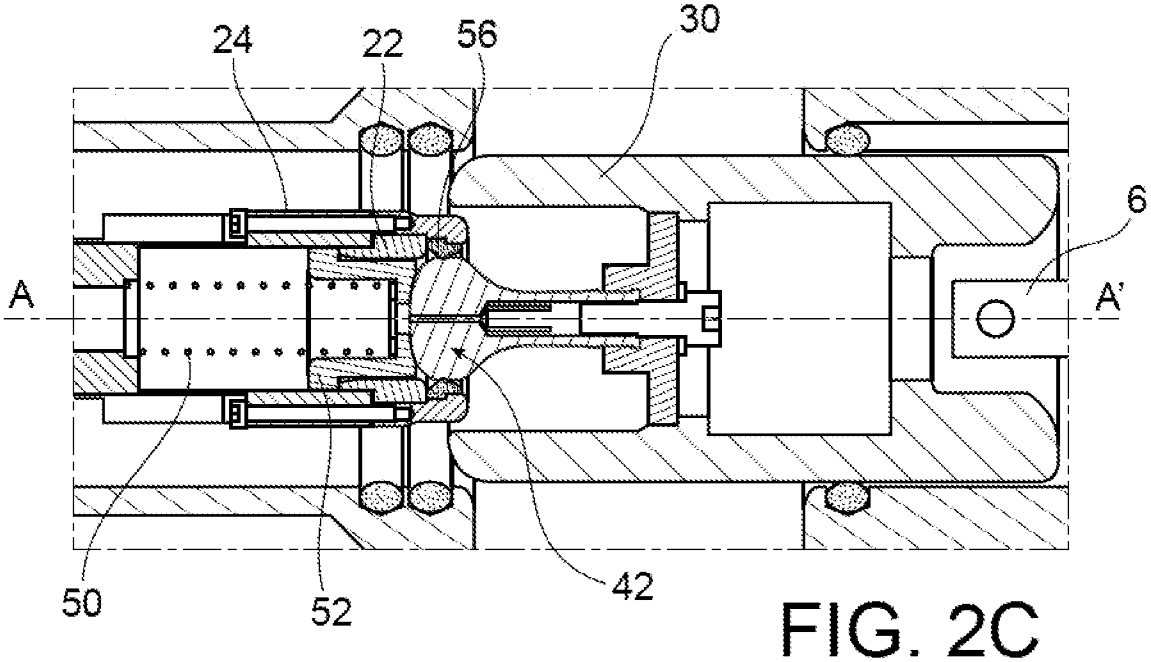
Figure 2D:
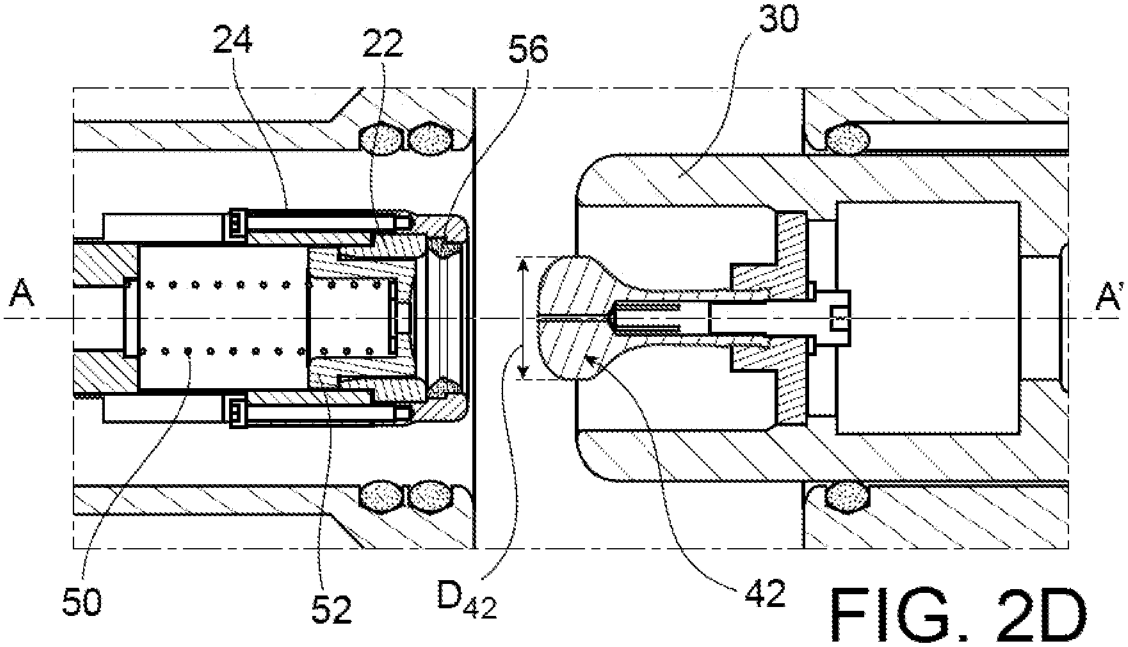

After initiation of the opening phase, the main contacts 30 (41) and 240/241 slide against each other (FIG. 2B). The arcing contact 22 also slide against arcing contact 42, together with the insulating piece 52, until the arcing contacts 22, 42 separate (FIG. 2C), which generates an arc 60 as explained above in connection with FIG. 3B: the insulating piece 52 being continuously pressed by the spring 50 against the movable arcing contact 42, the volume of gas which is exposed to the arc is very limited as explained above. The contacts 22, 42 then completely separate (FIG. 2D), the movement of the insulating piece 52 being preferably stopped as explained above.

Figure 4:
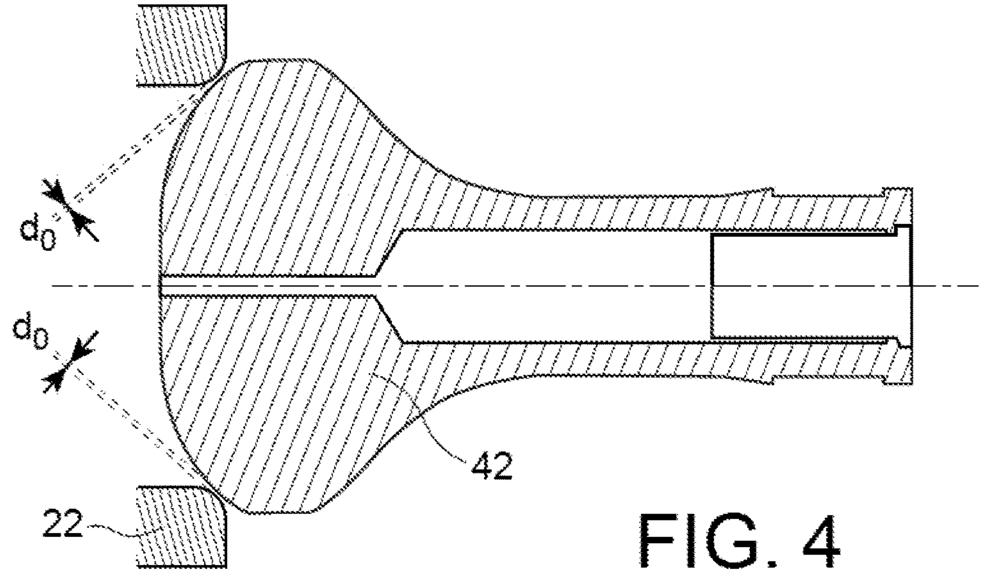
FIG. 4 shows the arcing contacts of a known disconnector.

According to a particular embodiment, the insulating piece 56 can maintain a pressure and/or exert some force towards the AA' axis on the movable arcing contact 42 after it has left the fixed arcing contact. As explained on FIG. 4 (which represents the arcing contacts of a known embodiment, without any of the insulating pieces 52, 56), if, due to their elasticity, the fingers $42_1$, $42_2$ of the movable arcing contact 42 expand just after leaving the fixed arcing contact 22, the distance $d_0$ between both the movable arcing contact 42 and the fixed arcing contact 22 is kept smaller over a certain period of time. The insulating piece 56 according to the invention can have an internal shape comprising a restriction $56_2$ of its internal diameter, which maintains some lateral pressure on the fingers $42_1$, $42_2$ of the movable arcing contact so that they cannot expand just after leaving the fixed arcing contact 22: thus the distance $d_1$ (see FIG. 3B) between the movable arcing contact 42 and the fixed arcing contact 22 is larger than the distance $d_0$ (if the fingers $42_1$, $42_2$ were relaxing due to their elasticity), which results in a shorter arcing duration: for example the arc has a duration reduced up to 75% or even 50% with respect to the arcing duration in a known circuit-breaker without any of the insulating pieces 52, 56 or without the insulating piece 56 having said restriction. To achieve this, the internal diameter $D_{56}$ (see FIG. 3B) of at least part of the insulating piece 56 is preferably identical to or smaller or slightly smaller than, the internal diameter $D_{22}$ of the fixed arcing contact, so that the fingers of the movable arcing contact 42 cannot expand. For example, $D_{56}$ is 1.5 mm shorter than $D_{22}$; it can hardly be smaller than this value because the slot between the fingers is 1.5 mm wide, which means that the 4 fingers can move toward each other only for 1.5 mm.

Figure 6:
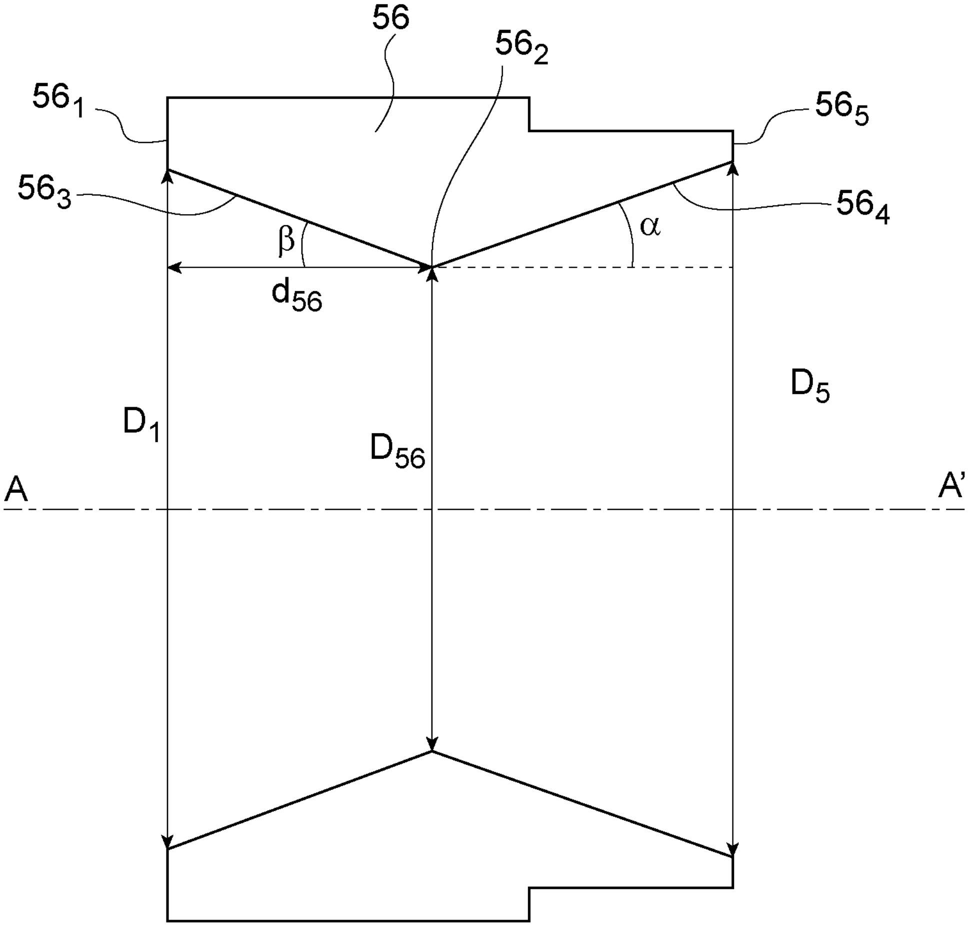
FIG. 6 illustrates an embodiment of an insulating piece implemented in an embodiment of the invention.

In a particular embodiment, the insulating piece 56 of the invention has a V-shaped cross section in a plane containing the AA' axis, as illustrated on FIGS. 3B and 6.

For example, as illustrated on FIG. 6 (a cross section in a plane containing the AA' axis) said insulating piece 56 extends between a front face $56_1$ which faces the fixed arcing contact 22 and an opposite back face $56_5$ and has a restriction $56_2$ (with a diameter D56) between said both ends; it has a first slope $56_3$ which is inclined in a first direction (towards the AA' axis) from the front face $56_1$ to the restriction $56_2$ and then a second slope $56_4$ which is inclined in the opposite direction from the restriction to the back face $56_5$. The diameter $D_1$ of the front opening (located in the same plane as the front face $56_1$) of the insulating piece 56 and the diameter $D_5$ of the back opening (located in the same plane as the back face $56_5$) are both larger than the diameter $D_{56}$ at the restriction. Thus, the second slope $56_4$ offers a regular shape for the movable arcing contact 42 which, when the disconnector is being closed, respectively opened, is thus progressively pressed towards the AA' axis, respectively opened in a direction opposed to the AA' axis.

This V-shaped cross section therefore allows a good electrical contact.

Preferably, the angle $\alpha$ is for example comprised between 50° and 10°, it is for example less than 45°.

Diameter $D_{56}$ is preferably selected so as to press the fingers 42 towards the axis AA' when closing the disconnector but without hindering them in their longitudinal movement along said axis.

Figure 5A:
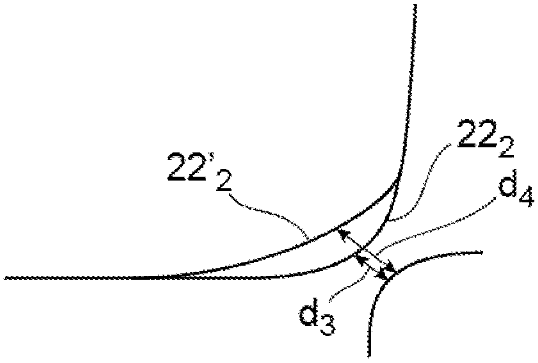
FIGS. 5A-5B show another embodiment of a fixed arcing contact according to the invention.
Figure 5B:
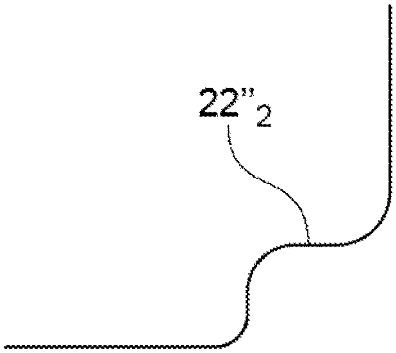

According to another particular embodiment, which can be combined with the other aspects and/or embodiments of this invention, the end of the fixed arcing contact has a concave shape as explained on FIG. 5A, which makes the separation between both the movable and the fixed arcing contacts even faster: as can be seen on FIG. 5A, the distance $d_3$ between the normal, regular shape $22_2$ of the front end of the arcing contact 22 and the movable arcing contact is smaller than the distance $d_4$ between the partly concave shape $22'_2$ of the front end of the arcing contact 22 and the movable arcing contact. This, again, reduces the duration of the arc. This effect is even amplified if the front side of the arcing contact 22 has a stepped shape as illustrated on FIG. 5B: as soon as both contacts separate from each other, the distance between them drastically increases, reducing correspondingly the duration of the arc, and therefore the decomposition of the gas.

Figure 7:
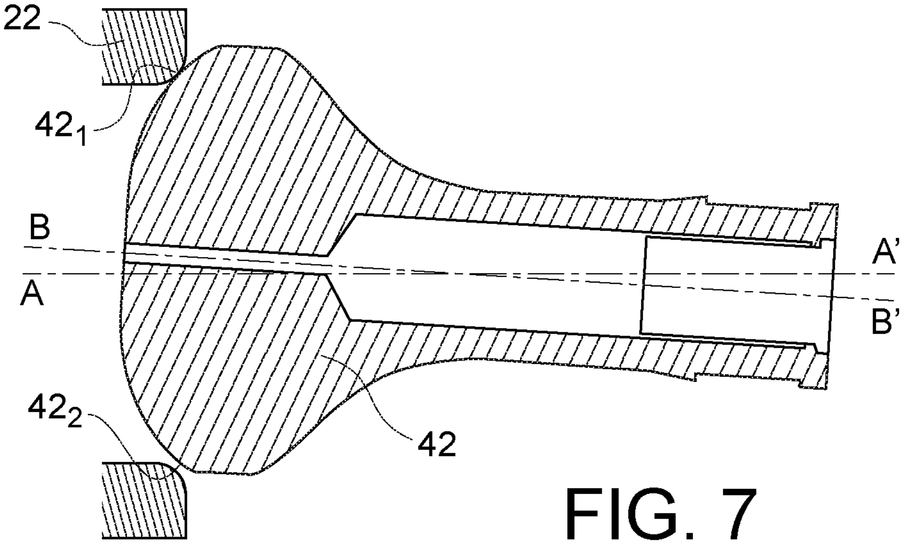
FIG. 7 illustrates the problem of the axis of the two arcing contacts not being aligned with each other.

Another problem is illustrated on FIG. 7: the axis of the fixed arcing contact, which corresponds to the axis AA' of the device, and the axis BB' of the movable arcing contact may not be aligned with each other. Even a slight misalignment results in an arc not being uniform or homogeneous around the central axis AA' of the device and in a corresponding irregular wear at the periphery of both arcing contacts, because (as illustrated on FIG. 7) one side $\mathbf{42}_1$ of the movable arcing contact is closer to the fixed arcing contact than the other side $\mathbf{42}_2$: there is therefore an irregular loss of material at the periphery of the arcing contacts.

The insulating piece 56 according to the invention contributes to guiding the movable arcing contact so that it is aligned with the fixed arcing contact or that the centre of the front end of the movable arcing contact is on the AA' axis. As a result, the next arcs will not occur in a limited zone of the arcing contacts which have been subject to said irregular loss of material, but the arcs will occur homogeneously around the axis AA'. Actually, this loss of material will induce a poor contact/absence of contact, so that the arc will prefer an undamaged area. After 100 shots, it has been seen that the whole circumference of the contact 42 has been damaged, but very slightly. This little wear regularly spread around the contact 42 allows not to create peak and edge, which are very sensitive for dielectric strength. The above mentioned irregular wear and loss of material is therefore strongly reduced.

The actuation system 6, 8 comprises for example a rod 6 actuated at one of its ends 62 by a lever 8 (see FIG. 1) mounted to pivot about an axis 14 (perpendicular to the axis AA' of the disconnector). The other end 64 of the rod 6 is mounted in rotation about an axis 16 to move the cylinder 30 along the axis AA'. In other words, the actuation system converts the rotation of the axis 14 into a translation of the cylinder along axis AA'.

The invention finds application in GIS which operate under a rather low voltage (for example 27V) and at a rather low current (for example 3000A).

A disconnector according to the invention can be set up in a double busbar arrangement with coupling:

A Bus Transfer Current Switching (BTCS);

Or a Bus Charging Current Switching (BCCS).

The GIS comprises and operates in a gas, for example $SF_6$; alternatively, in order to reduce the greenhouse effects resulting from the use of $SF_6$, the following gas may be used:

- a gas comprising heptafluoroisobutyronitrile and/or heptafluoroisopropyl trifluoromethyl ketone (also named 2-butanone, 1,1,1,3,4,4,4-heptafluoro-3-(trifluoromethyl)-(CAS No 756-12-7)), possibly mixed with a gas or a dilution gas comprising at least $CO_2$ and/$O_2$ and/or $N_2$ and/or and/or an oxygenated compound;
- or in a gas comprising at least $CO_2$ and/$O_2$ and/or $N_2$ and/or an oxygenated compound.

The reduced arcing time obtained with a disconnector according to the invention reduces the decomposition of a gas like one of the above mentioned alternative gas.

The invention claimed is:

1. A disconnector for a Gas-Insulated Substation (GIS), comprising:
- a pair of permanent contacts, one fixed and the other one movable along an axis, called the axis of the disconnector;
- a pair of arcing contacts, one fixed and the other one movable;
- an insulating part located inside the fixed arcing contact, and a spring configured for pressing the insulating part against a front surface of the movable arcing contact;
- an insulating ring located at an outlet of the fixed arcing contact; and
- wherein, when the pair of arcing contacts separate, the pair of arcing contacts form, together with the insulating part and the insulating ring, a limited volume which contains a limited quantity of gas.

2. The disconnector according to claim 1, the insulating ring having an internal restriction.

3. The disconnector according to claim 1, the insulating ring having a V-shaped section in a plane containing the axis.

4. The disconnector according to claim 3, the insulating ring extending along the axis between a front face which faces the fixed arcing contact and an opposite back face and an opposite back face internal surface having a restriction between both ends.

5. The disconnector according to claim 4, the internal surface having a first slope which is inclined in a first direction from the front face to the restriction and then a second slope which is inclined in an opposite direction from the restriction to the back face.

6. The disconnector according to claim 5, the second slope being inclined with an angle comprised between 50° and 10° with respect to the axis of a circuit breaker.

7. The disconnector according to claim 1, a front end of the fixed arcing contact having a concave portion.

8. The disconnector according to claim 1, a front end of the fixed arcing contact having a stair step shape.

9. The disconnector according to claim 1, at least part of the insulating part located inside the fixed arcing contact having a shape of a disk or of a cylinder.

10. A GIS comprising:
- metal tank filled with a gas;
- the disconnector according to claim 1.

11. The GIS according to claim 10, the gas comprising $SF_6$, or heptafluoroisobutyronitrile and/or heptafluoroisopropyl trifluoromethyl ketone (also named 2-butanone, 1,1,1,3,4,4,4-heptafluoro-3-(trifluoromethyl)-(CAS No 756-12-7)) and/or $CO_2$ and/or $O_2$ and/or $N_2$ and/or an oxygenated compounds, comprising both $CO_2$ and a fluorinated compound.

12. A method for opening the disconnector of the GIS according to claim 10, comprising:
- moving the movable arcing contact and a movable main contact with respect to the fixed arcing contact and a fixed main contact, thereby opening the movable main contact and closing the pair of arcing contacts, and pressing the insulating part located inside the fixed arcing contact against a front surface of the movable arcing contact;
- separating the pair of arcing contacts from each other, thereby triggering an arc between the pair of arcing contacts, in a volume limited by the pair of arcing contacts and by both the insulating part and the insulating ring.

13. A disconnector for a Gas-Insulated Substation (GIS), comprising:
- a pair of permanent contacts, one fixed and the other one movable along an axis, called the axis of the disconnector;
- a pair of arcing contacts, one fixed and the other one movable;
- an insulating part located inside the fixed arcing contact, and a spring configured for pressing the insulating part against a front surface of the movable arcing contact;
- an insulating ring located at an outlet of the fixed arcing contact;

the insulating ring having an internal diameter equal to or smaller than, an internal diameter of the fixed arcing contact.

14. A disconnector for a Gas-Insulated Substation (GIS), comprising:

a pair of permanent contacts, one fixed and the other one movable along an axis, called the axis of the disconnector;

a pair of arcing contacts, one fixed and the other one movable;

an insulating part located inside the fixed arcing contact, and a spring configured for pressing the insulating part against a front surface of the movable arcing contact;

an insulating ring located at an outlet of the fixed arcing contact;

the insulating part located inside the fixed arcing contact comprising a stopping member cooperating with a stopping member of the fixed arcing contact to block movement of the insulating part under action of the spring pressing the insulating part against a front surface of the movable arcing contact.

* * * * *